United States Patent
Knab et al.

(10) Patent No.: US 12,261,922 B2
(45) Date of Patent: Mar. 25, 2025

(54) METHOD AND GATEWAY DEVICE FOR TRANSMITTING DATAGRAMS VIA A PLURALITY OF NETWORKS

(71) Applicant: Siemens Aktiengesellschaft, Munich (DE)

(72) Inventors: Benjamin Knab, Karlsbad (DE); Saad Nhili, Karlsruhe (DE); Anil Kumar Chorppath, Rastatt (DE)

(73) Assignee: Siemens Aktiengesellschaft, Munich (DE)

( * ) Notice: Subject to any disclaimer, the term of this patent is extended or adjusted under 35 U.S.C. 154(b) by 351 days.

(21) Appl. No.: 17/639,740

(22) PCT Filed: Jul. 7, 2020

(86) PCT No.: PCT/EP2020/069128
§ 371 (c)(1),
(2) Date: Mar. 2, 2022

(87) PCT Pub. No.: WO2021/043466
PCT Pub. Date: Mar. 11, 2021

(65) Prior Publication Data
US 2022/0294878 A1 Sep. 15, 2022

(30) Foreign Application Priority Data
Sep. 3, 2019 (EP) .................................... 19195161

(51) Int. Cl.
*H04L 67/61* (2022.01)
*H04L 45/02* (2022.01)
(Continued)

(52) U.S. Cl.
CPC .............. *H04L 67/61* (2022.05); *H04L 45/04* (2013.01); *H04L 47/6215* (2013.01); *H04L 67/12* (2013.01)

(58) Field of Classification Search
CPC ..... H04L 67/61; H04L 45/04; H04L 47/6215; H04L 67/12
(Continued)

(56) References Cited

U.S. PATENT DOCUMENTS 6,252,872 B1 * 6/2001 Tzeng ..................... H04L 49/30
370/360
2011/0019556 A1 1/2011 Hsin et al.
(Continued)

FOREIGN PATENT DOCUMENTS

| EP | 2537322 | 12/2012 | |
|---|---|---|---|
| WO | 0056023 | 9/2000 | |
| WO | WO-0056023 A1 * | 9/2000 | ........... H04L 12/569 |

OTHER PUBLICATIONS

Savage, Stefan, "Router Implementation", pp. 1-22, 2015.
(Continued)

*Primary Examiner* — Xuan Lu
(74) *Attorney, Agent, or Firm* — Cozen O'Connor (57) ABSTRACT

A method for transmitting a plurality of datagrams by a gateway device with a plurality of network interfaces includes determining a first priority queue from a plurality of the priority queues for transmittal of a first datagram from the plurality of datagrams, based on a filter and the datagram identifier of the first datagram, and placing the first datagram in the determined first priority queue for transmittal of the first datagram by a first network interface associated with the determined first priority queue, where the datagram identifier of the first datagram is generated by a control device based on network Quality of Service (QoS) requirements associated with a process application associated with the first datagram.

15 Claims, 5 Drawing Sheets

(51) Int. Cl.
  *H04L 47/24* (2022.01)
  *H04L 47/62* (2022.01)
  *H04L 67/12* (2022.01)
  *H04L 69/18* (2022.01)
  *H04W 4/70* (2018.01)
  *H04W 28/02* (2009.01)

(58) Field of Classification Search
  USPC .......................................................... 370/389
  See application file for complete search history.

(56) References Cited

U.S. PATENT DOCUMENTS

| | | | |
|---|---|---|---|
| 2011/0231014 A1 | 9/2011 | Krajewski et al. | |
| 2011/0261688 A1 | 10/2011 | Sharma et al. | |
| 2012/0236713 A1 | 9/2012 | Kakadia et al. | |
| 2013/0329742 A1* | 12/2013 | Chinta | H04L 49/00 370/400 |
| 2018/0123950 A1 | 5/2018 | Garg et al. | |
| 2018/0288646 A1* | 10/2018 | Pang | H04W 88/16 |
| 2018/0309818 A1 | 10/2018 | Park et al. | |
| 2019/0045490 A1* | 2/2019 | Davydov | H04L 5/0044 |
| 2020/0259896 A1* | 8/2020 | Sachs | H04W 12/04 |
| 2020/0322696 A1* | 10/2020 | Dvir | H04N 21/816 |

OTHER PUBLICATIONS

Rouse, Margaret, "What is a gateway? Definition from Whatis. com", pp. 1-6, 2019.
PCT International Preliminary Report on Pantentability mailed Nov. 17, 2021 corresponding to PCT International Application No. PCT/EP2020/069128 filed Jul. 7, 2020.

* cited by examiner

METHOD AND GATEWAY DEVICE FOR TRANSMITTING DATAGRAMS VIA A PLURALITY OF NETWORKS

CROSS-REFERENCE TO RELATED APPLICATIONS

This is a U.S. national stage of application No. PCT/EP2020/069128 filed 7 Jul. 2020. Priority is claimed on European Application No. 19195161.5 filed 3 Sep. 2019, the content of which is incorporated herein by reference in its entirety.

BACKGROUND OF THE INVENTION

1. Field of the Invention

The present disclosure relates to communication of data in industrial facilities and, more particularly, to a method and gateway device for transmitting datagrams via a plurality of networks.

2. Description of the Related Art

Industrial facilities contain a plurality of devices, such as field devices, control devices, and/or enterprise servers, which often communicate with each other and other remote systems. This communication is often enabled by gateway devices placed in the industrial facilities.

Industrial automation systems are designed to monitor and control technical processes, particularly for factory, process or building automation, and provide for operating control devices, sensors, machines and industrial plants autonomously and substantially independent from human intervention. Usually, industrial automation systems comprise a plurality of automation devices interconnected with each other via an industrial communication network. Due to a continuously growing impact of information technology on industrial automation systems, approaches for reliably providing monitoring and control functions within industrial automation systems gain increasing importance. Particular challenges experienced in industrial automation systems frequently result from message traffic with a large number of messages which are relatively short.

Generally, interruptions of communication connections might cause an unfavorable repetition of transmission of messages. Again, this usually results in additional loads on communication connections, which may further lead to malfunctions or system faults. If messages are not transmitted at all or not transmitted completely, then an industrial automation system may be prevented from changing into a safe operating state or from remaining in such a safe operating state. Finally, this may lead to a costly outage of an entire production system.

Conventional wireless industrial gateways rely on industrial wireless local area networks (IWLANs) for communication of data. With the advent of fifth generation cellular networks (also referred to as 5G networks), machine to machine communication especially in relation to real time communication, amongst industrial devices may be enabled via 5G networks. However, due to extensive bandwidth required by industrial communication, it may not be optimal to utilize 5G networks for transmission of all industrial communication. Especially, it may not be optimal to transmit time critical industrial data and non-time critical industrial data over 5G networks.

To address this issue, a plurality of approaches has been explored. One such approach focuses on usage of integrated WLAN and LTE network devices. An implementation of the integrated wireless local area network (WLAN) and long-term evolution (LTE) network devices in the case of industrial networks may be further improved. In particular, a device capable of prioritizing datagrams in an industrial environment is needed.

SUMMARY OF THE INVENTION

In view of the foregoing, it is an object of the present invention to provide a method and device for transmitting datagrams via a plurality of networks in a manner that addresses the above-mentioned issues.

This and other objects are achieved in accordance with the invention by a method for transmitting a plurality of datagrams over a plurality of networks by a gateway device, where the gateway device receives datagrams from control devices (i.e., controllers and other industrial devices) and then forwards the datagrams to other systems or device associated with the industrial facility and vice-versa. The gateway device comprises a plurality of network interfaces. Each network interface is connected to a network from the plurality of networks. In an embodiment, the plurality of networks include a cellular network and a local area network. Accordingly, the plurality of interfaces includes a network interface connected to a cellular network and another network interface connected to a Local Area Network (for example, an industrial wireless Local Area Network). Each datagram from the plurality of datagrams is generated by an industrial or control device and contains a datagram identifier and datagram payload. The datagram payload contains data in related to a process in the industrial plant.

The method comprises determining a first priority queue from a plurality of the priority queues for transmittal of a first datagram from the plurality of datagrams, based on a filter and the datagram identifier of the first datagram. Each priority queue from the plurality of priority queues is associated with a corresponding network interface from the plurality of network interfaces of the gateway device. Subsequent to the determining step, the method further comprises placing the first datagram in the determined first priority queue for transmittal of the first datagram by a first network interface associated with the determined first priority queue. The datagram identifier of the first datagram is generated by a control device based on network Quality of Service (QoS) requirements associated with a process application associated with the first datagram.

In an embodiment, the datagram identifier of the first datagram is generated by a control device according to a first communication protocol and the control device is configured to communicate over a plurality of communication protocols, where the plurality of communication protocols include the first industrial protocol. This allows for easy realisation of a prioritisation scheme without significant modification of communication schemes.

In an embodiment, the filter comprises a plurality of bit masks. Each bit mask is associated with a corresponding priority queue from the plurality of priority queues. Accordingly, the step of determining the first priority queue comprises identifying a first bit mask from the plurality of bit masks in the filter, where a result from a binary operation on the datagram identifier and the first bit mask is equal to a preconfigured value and where the first bitmask is associated with the first priority queue.

In another embodiment, the binary operation is a bitwise operation, such as a bitwise AND operation, or a bitwise XOR operation.

In an embodiment, the filter is generated by a network controller based on a network topology of the industrial facility and engineering data including network QoS requirements associated with a plurality of process applications.

In a further embodiment, the control device is a process controller connected to at least one field device comprising at least one of an actuator and a sensor, and where network Quality of Service (QoS) requirements includes a loop cycle time of a control loop associated with the process controller. In another exemplary embodiment, the control device is an operator device, and the process application is an augmented reality application.

In another embodiment, present invention provides a method of transmitting datagrams by a control device. Here, the method comprises generating a first datagram to be transmitted, where the first datagram associated with a process application in the industrial plant; generating a datagram identifier for the first datagram based on network Quality of Service requirements (QoS) associated with the process application, where the generated datagram identifier is indicative of a priority of the first datagram; and transmitting the first datagram to a gateway device connected to the control system, where the gateway device comprises a plurality of network interfaces connected to two or more networks. The datagram identifier of the first datagram is used by the gateway device to identify a network interface for transmitting the first datagram. In an exemplary embodiment, the step of generating a first datagram comprises identifying a first industrial communication protocol from a plurality of industrial communication protocols (also referred to as communication protocols), based on network Quality of Service requirements (QoS) associated with the process application.

It is also an object of the invention to provide a gateway device for transmitting and receiving a plurality of datagrams. The gateway device comprises a plurality of network interfaces including a first network interface connected to a first network and a second network interface connected to a second network, a plurality of priority queues, each priority queue for storing one or more datagrams and associated with one of the first and second network interface, and a datagram classification module connected to a content address memory module. The datagram classification module is configured to determine a first priority queue from the plurality of the priority queues for transmittal of a first datagram from the plurality of datagrams, based on the datagram identifier of the first datagram and a filter, and to place the first datagram in the determined first priority queue for transmittal of the first datagram by a network interface associated with the determined first priority queue.

In an exemplary embodiment, the content address memory module is a ternary content address memory module used by the datagram classification module for determining the first priority queue. This allows for fast resolution (single cycle) of identifier to queue determination.

It is a further object of the invention to provide a non-transitory storage medium for transmitting a plurality of datagrams. The non-transitory storage medium contains a plurality of machine-readable instructions stored therein, which when executed by a processor, cause the processing unit to determine a first priority queue from a plurality of the priority queues for transmittal of a first datagram from the plurality of datagrams, based on the datagram identifier of the first datagram, and place the first datagram in the determined first priority queue for transmittal of the first datagram by a network interface associated with the determined first priority queue.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

These aspects are further described and explained with reference to the figures provided, where the following detailed description references the drawings, in which.

DETAILED DESCRIPTION OF THE EXEMPLARY EMBODIMENTS

Figure 1:
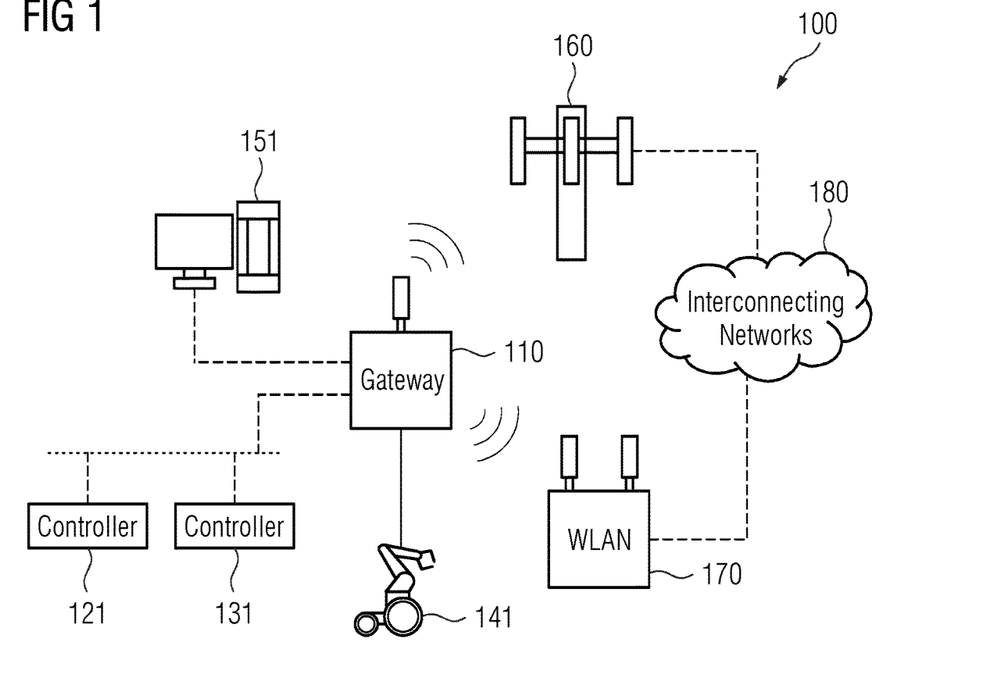
FIG. 1 illustrates an exemplary industrial system with a plurality of industrial devices, such as field and control devices, in accordance with the invention.

FIG. 1 illustrates an industrial system 100 in an industrial facility. Industrial facility herein refers to any environment where at least one industrial process, such as manufacturing, refining, smelting, assembly of equipment, may occur and includes process plants, oil refineries, and/or automobile factories. The industrial system 100 includes a plurality of control devices, such as process controllers (shown in the figure as controller 110 and controller 120), programmable logic controllers, supervisory controllers, robots (shown in the figure as mobile robot 141), and/or operator devices (shown in figure as operator stations 151). The process controllers (110 and 120) are connected to a plurality of field devices (not shown in figure), such as actuators and sensor devices, for monitoring and controlling industrial processes in the industrial facility. These field devices can include flowmeters, value actuators, temperature sensors, and/or pressure sensors. The process controllers 110 and 120 may be connected to each other via a control network. Additionally, the industrial system 100 includes a mobile robot 141, for performing a plurality of operations such as welding, assembly of parts, transportation and handling of material, etc., in the industrial plant. Additionally, the industrial system 100 may include an operator station 151, for displaying the status of the industrial plant to an operator and for allowing the operator to define KPIs for controlling the industrial processes in the facility.

Communication in the industrial facility may occur through industrial gateway devices (also referred to as gateway devices). The plurality of the control devices in the facility are connected to at least one industrial gateway device (shown in the figure as exemplary gateway device 110) for communicating information with the other devices and systems in the industrial facility. The gateway device 110 is connected to a plurality of networks via a first and second network interface and is capable of transmitting data via the plurality of networks. For example, the gateway device 110 is connected via a first network interface to a cellular network (shown via connection to cell tower 160) and via a second network interface to an industrial wireless local area network (shown via connection to a Wireless Local Area Network device 170).

As shown in FIG. 1, the gateway device 110 is connected to the process controllers (121 and 131), the mobile robot 141 and the operator station 151 (collectively referred to as connected devices). The gateway device 110 receives and transmits data (datagrams, data frames, data packets) to the process controllers (121 and 131), the mobile robot 141 and the operator station 151. The gateway device comprises two network interfaces. Accordingly, transmission of the data from the connected devices occurs over one of the two network interfaces based on the datagram identifier of the datagrams received from the connected devices. Based on network characteristics associated with the two networks to which the gateway device 110 is connected, one network interface is for transmission of datagrams with high priority and the other network interface is for transmission of datagrams with normal priority. For example, the first network interface connected to the cellular network (5G network) is for transmission of datagrams with high priority and the second network interface connected to the industrial wireless local area network is for transmission of datagrams with normal priority. Resolution of the network interface over which a datagram is to be sent occurs based on the datagram identifier.

Figure 2:
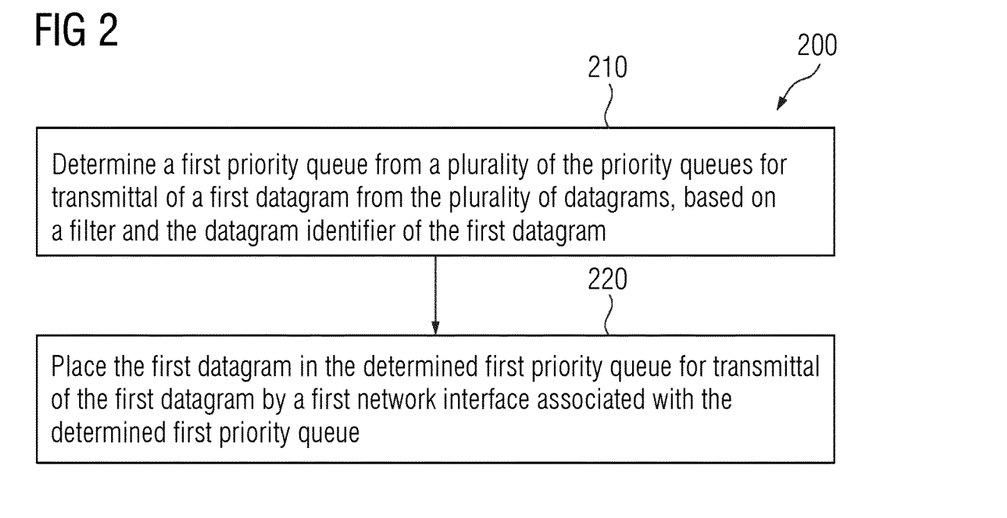
FIG. 2 illustrates an exemplary method for transmitting a plurality of datagrams via two or more networks in accordance with the invention.

FIG. 2 illustrates a method 200 for transmitting a plurality of datagrams by the gateway device 110. The plurality of datagrams are generated by the one or more of the connected devices. Each datagram from the plurality of datagrams comprises a datagram identifier and datagram payload. The datagram identifier of the datagram is generated by the connected control device based on network Quality of Service (QoS) requirements associated with a process application associated with the datagram. The datagram payload is associated with a process in the industrial plant, related to the corresponding control device. For example, a datagram from the controller 121, may have an exemplary payload containing process values of a process regulated by the controller 121. The gateway receives the plurality of datagrams from the connected devices and is responsible for transmission of the same.

As mentioned previously, the gateway device comprises a plurality of network interfaces and is connected to a plurality of networks via the plurality of interfaces. In an embodiment, the gateway device is connected to a cellular network (5G network) via a first network interface (shown in FIG. 3 as network interface 360) and is connected to a wireless local area network via a second network interface (shown in FIG. 3 as network interface 370).

Figure 3:
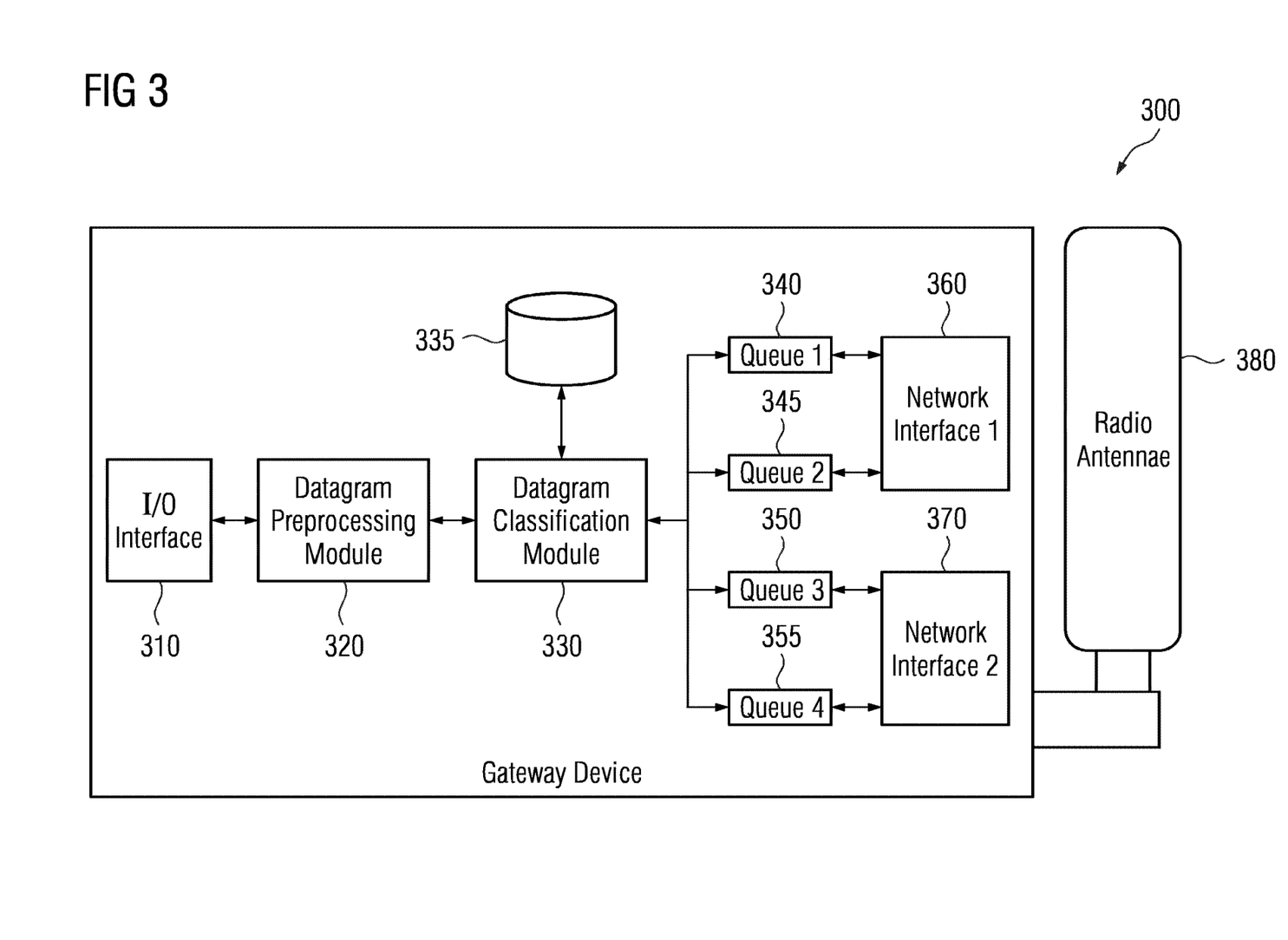
FIG. 3 illustrates an exemplary gateway device for transmitting a plurality of datagrams via two or more networks in accordance with the invention.
Figure 4:
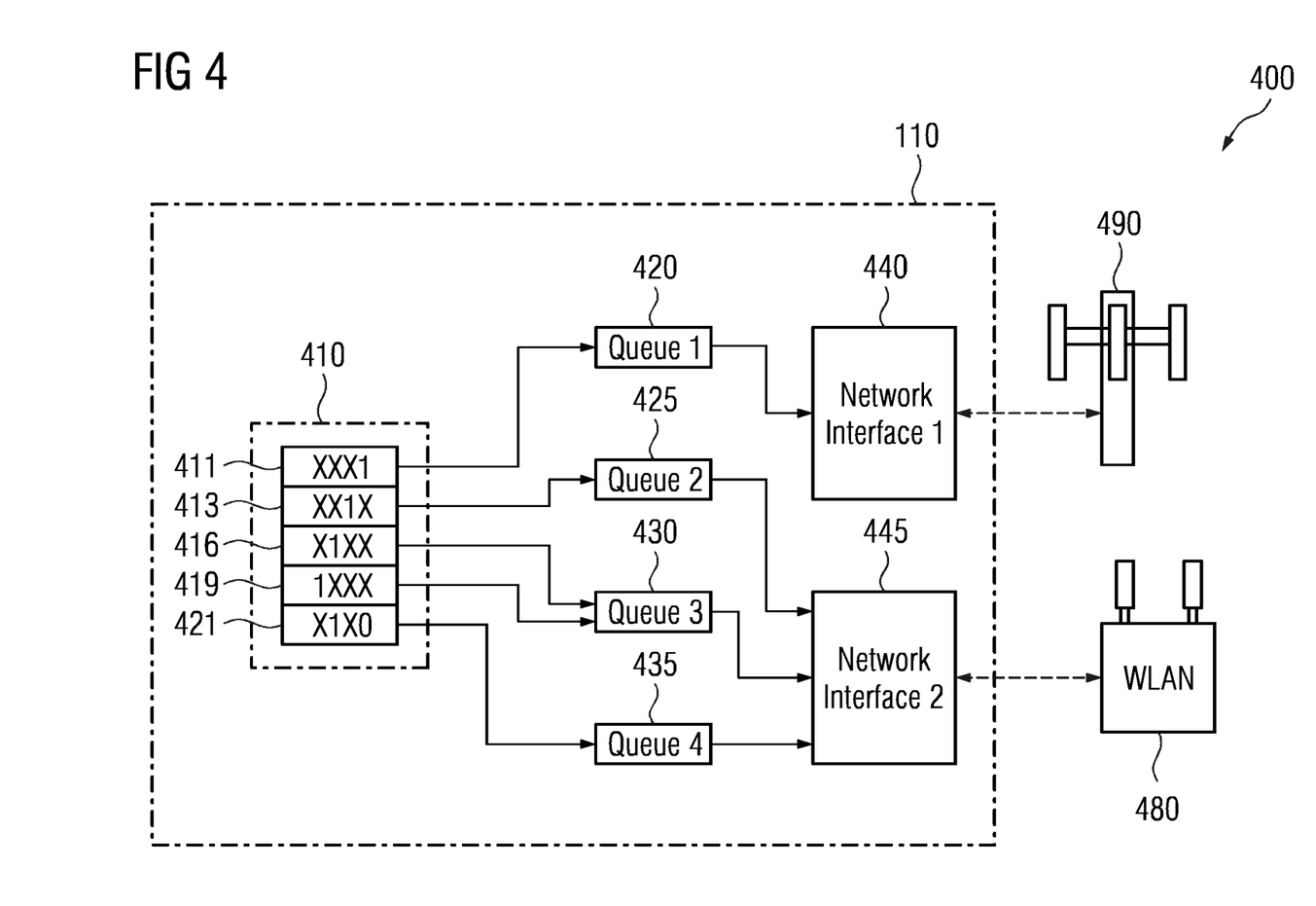
FIG. 4 illustrates an exemplary filter for resolving identifiers into priority queues in accordance with the invention.

In addition to the interfaces, the gateway device further comprises a plurality of priority queues (shown in FIG. 3 as queues 340, 345, 350 and 355 and in FIG. 4 as queues 420, 425, 430 and 435). The priority queues (also referred to as queues) are for storing datagrams prior to transmission via either of the first or second network interfaces (360 and 370 in FIG. 3, and 440 and 445 in FIG. 4). Each priority queue is associated with a corresponding network interface and datagrams stored in the particular queue are sent by the corresponding network interface. For example, as shown in FIG. 3, queues 340 and 345 are associated with the network interface 360. Similarly, queues 350 and 355 are associated with the network interface 370. Similarly, as shown in FIG. 4, queue 420 is associated with the network interface 440 and queues 425, 430 and 430 are associated with the network interface 445.

With reference to FIG. 2, at step 210, the gateway device 110 determines a first priority queue from a plurality of the priority queues for transmittal of a first datagram from the plurality of datagrams, based on a filter and the datagram identifier of the first datagram. Returning to FIG. 3, as shown therein, the gateway device comprises a datagram classification module 330 that receives datagrams and determines the queue in which each datagram from the datagrams is to be placed for transmission. The datagram classification module is connected to a content address memory module which stores a filter. The filter comprises a plurality of bit masks. The filter further comprises mappings between the bit masks and the priority queues. Upon receiving a datagram (for example, a first datagram), the datagram classification module 330, performs a logical operation between the datagram identifier and each of the bit masks of the filter. When a logical operation between the datagram identifier and a particular bit mask results in value equivalent to a preconfigured value, the datagram classification module 330, identifies the queue associated with the particular bitmask and selects the corresponding queue (as the first priority queue) for transmittal of the corresponding datagram, which is further explained using an example below with reference to FIG. 4.

In the example, a first datagram with the datagram identifier '8810' is generated by the controller 121 and is sent to the gateway module 110 for further transmission. The first datagram is received, preprocessed (by datagram preprocessing module 320) and is to be placed in one of the priority queues (420, 425, 430 and 435) for transmission by the network interfaces. The datagram classification module 330 loads the filter (shown in the FIG. 4 as filter 410) from the memory 335. The filter 410 comprises five bit masks 411, 413, 416, 419 and 421. Each bit mask comprises '1's, '0's and one or more don't care bits (shown in FIG. 4 as 'X').

Subsequent to loading the filter 410, the datagram classification module 330 (see FIG. 3) performs a bitwise binary 'AND' operation on the datagram identifier '8810' of the first datagram and each bit mask (411, 413, 416, 419 and 421) in the filter 410. Bitwise binary 'AND' between each of the bit mask 411, 416, 419 and 421 and the datagram identifier '8810' generates the result 0. Bitwise binary 'AND' between bit mask 413 and the datagram identifier '8810' generates the result 1. As shown in FIG. 4, the bit mask 413 is mapped to priority queue 425. Accordingly, the datagram classification module 330 identifies priority queue 425 as the first priority queue for storing the first datagram prior to transmission.

With reference to FIG. 2, at step 220, the datagram classification module 330 of the gateway device 110, places the first datagram in the determined first priority queue for transmittal of the first datagram by a first network interface associated with the determined first priority queue. Subsequent to the identification of the first priority queue, the data classification module 330 (see FIG. 3) then places the datagram in the identified priority queue. The datagram is then transmitted by the first network interface associated with the first queue.

Continuing the above-mentioned example, subsequent to the determination of the priority queue 425 as the first priority queue, the data classification module 300 places the datagram with the datagram identifier '8810' in the priority queue 425. The datagram with the datagram identifier '8810' is then transmitted by the network interface 445 over the second network 490 from the plurality of networks (480 and 490) to which the gateway device 110 is connected.

As mentioned previously, the datagram identifier of the datagram is generated by the connected control device based on network Quality of Service (QoS) requirements associated with a process application (also referred to as control application) associated with the datagram. Network Quality of service herein refers to at least one network property, such as transmission delay, availability, and/or bit rate. Based on the requirement associated with the process application, the control device can determine a datagram identifier using a coding or selection scheme to indicate a priority of the datagram. In so doing, the control device can indicate the priority of the datagram. In an exemplary embodiment, based on a network quality of service requirements (for example transmission delay) associated with the process application, the control device selects a communication protocol for datagram transmission from a plurality of communication protocols. According to the protocol selected, the datagram identifier is then generated, which is further explained in reference to an example as illustrated in FIG. 5.

Figure 5:
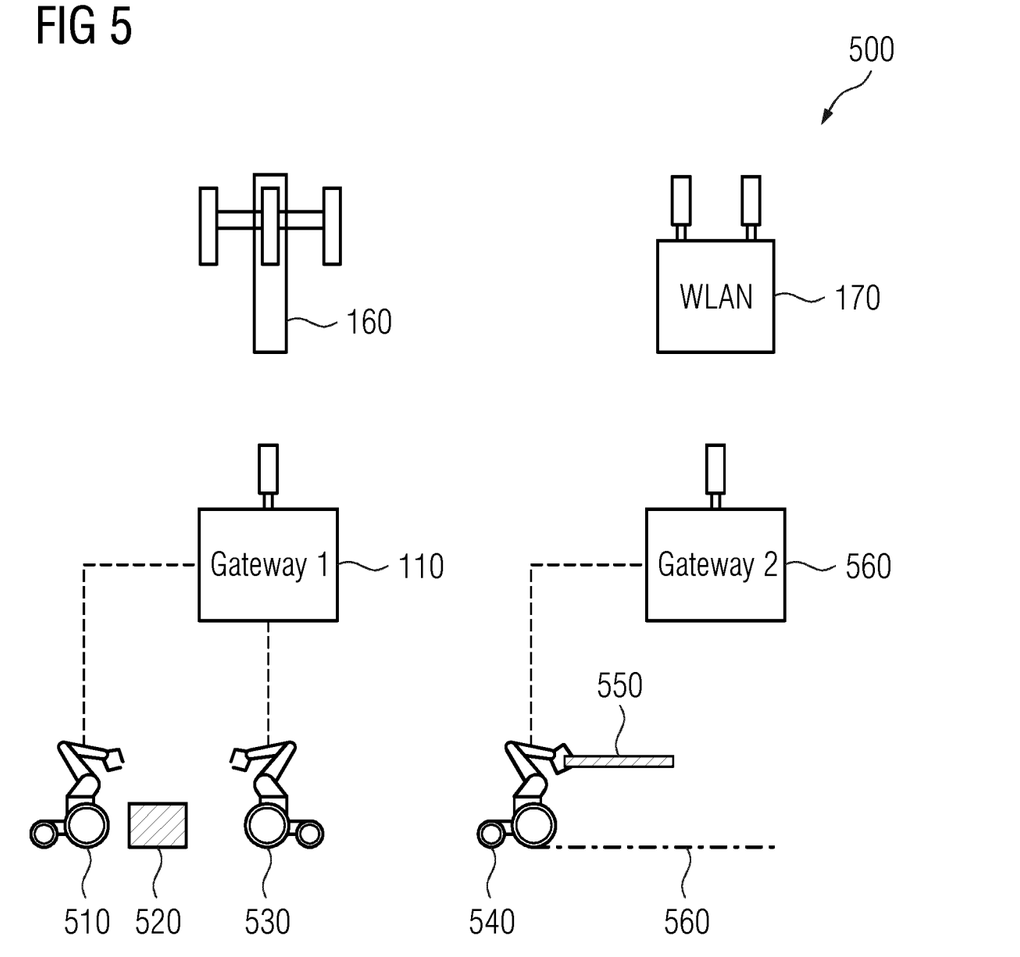
FIG. 5 illustrates an exemplary section of an industrial facility comprising three robotic devices mounted on automated guided vehicles in accordance with the invention.

FIG. 5 illustrates an exemplary section of the industrial facility containing three mobile robotic device 510, 530 and 540. The mobile robotic devices 510 and 530 are wirelessly connected to gateway device 110 and gateway device 560. All three of the robotic devices can communicate using S7 industrial communication protocol and the PROFINET communication protocol.

The mobile robotic device 540 is carrying an object 550 along a path 560. While following the path 560, the control application on the mobile robotic device 540 sends datagrams containing information regarding the location and status of the mobile robotic device 540. This operation is not time sensitive. Consequently, the control application does not have strict network QoS requirements and, accordingly, the mobile robotic device 540 sends the datagrams using S7 protocol and, accordingly, the datagram identifiers have the format '0x8032______'. Therefore, upon receiving datagrams from the mobile robotic device 540, the gateway device 560, assigns the packet to a queue connected to a WLAN network based on a filter as described above.

The mobile robotic devices 510 and 530 coordinate with each other to handle the object 520. Accordingly, for efficient coordination, the control applications on the mobile robotic devices 510 and 530 exchange datagrams with each other to coordinate arm movement with each other. This is a time-sensitive operation, however. Accordingly, the control applications have strict network QoS requirements and, accordingly, the mobile robotic devices send the datagrams using the PROFINET protocol and, accordingly, the datagram identifiers have the format '0x8892______'. As a result, upon receiving datagrams from the mobile robotic device 540, the gateway device 560, assigns the packet to a queue connected to a 5G network based on a filter as described above.

While the above example is explained using selection of industrial communication protocols, the same may be realized by the controller using traffic classes and other such prioritization schemes. For example, the controller may generate a datagram identifier based on the time sensitive networking (TSN) traffic class associated with the datagram. In another example, the controller may generate a datagram identifier based on the ISA 100 application class associated with the process application. In another example, the controller may generate a datagram identifier based on classes associated with the Open Platform Communications Unified Architecture (OPC UA) protocol.

Returning to FIG. 3, illustrated therein is an exemplary gateway device 300. As described previously, the gateway device 300 is connected to a plurality of control devices via a I/O interface 310. The I/O interface 310 may be based on an industrial bus protocol or industrial ethernet or industrial wireless protocol. The gateway device 300 receives datagrams from the control devices and forwards them on one of two or more networks to which the gateway device 300 is connected.

Upon receiving datagrams, the datagrams are preprocessed by a datagram preprocessing module 320. The datagram preprocessing module checks the validity and integrity of the datagrams. Subsequent to preprocessing, the datagrams are then stored on a plurality of priority queues (shown in FIG. 3 as queues 340, 345, 350, and 355) by the datagram classification module 330. Each queue is associated with a network interface from a plurality of network interfaces connected to the corresponding networks. For example, as shown in FIG. 3, queues 340 and 345 are connected to network interface 360 and queues 350 and 355 are connected to network interface 370. The datagram classification module 330 places each datagram from the plurality of datagrams in a particular queue based on the datagram identifier and the filter. The filter is stored on memory module 335. In an exemplary embodiment, the memory module 335 is a ternary content-addressable memory (TCAM) module. Each datagram stored in the corresponding queue is then transmitted via the corresponding network interface on the corresponding network.

In case a network or network interface malfunctions and is no longer be available for transmission of the datagrams, the queues associated with the malfunctioning network interface is unbound from the malfunctioning network interface and is associated with the remaining network interfaces. Datagrams in the queues are prioritized for transmission based on the queues in which they are stored. For example, if the network interface 360 starts to malfunction, then the queues 340 and 345 are assigned to the network interface 370. Accordingly, between the datagrams from queue 340 and datagram 350, datagrams from queue 340 are prioritized for transmission.

FIG. 4 illustrates an exemplary filter 410 for resolving identifiers into priority queues (420, 425, 430, 435). The filter 410 comprises five bit masks (411, 413, 416, 419 and 421). Each bit mask is comprised of 1, 0 and don't care bits (indicated as X) and is mapped to a particular queue from the plurality of queues. As shown in FIG. 4, bit mask 411 is mapped to queue 420, bit mask 413 to queue 425, bit masks 416 and 419 to queue 430 and bit mask 421 to queue 435. The queues are connected to the network interfaces (440 and 445) and store datagrams prior to their transmission by the corresponding network interface over the corresponding network (490 or 480). The queue on which a particular datagram is to be stored is resolved using the bitmasks of the filter and the datagram identifier by performing a logical operation between the bit masks and the datagram identifier. The result from the logical operation is compared against a predetermined value and if they are equivalent the datagram is stored on the queue associated with the corresponding bit mask. While the bit masks are shown, other such schemes using hexadecimal values may also be used to realize the current invention. Additionally, the mapping between the bit mask and the queue may be changed dynamically. Additionally, new bit masks may be added to the filter without restarting the gateway devices, as further explained below.

In an embodiment, the filter is generated by a network controller and transmitted to the gateway devices (for example, gateway 110). The network controller is connected to a plurality of gateway devices. Upon detection of a new control device in the industrial network, the network controller coordinates with the newly connected control device to determine prioritization of datagrams from the newly connected control device and the corresponding coding schemes used by the newly connected control device. Based on this coordination, the network controller can determine whether the filter in the gateway devices must be updated. In an example, new filters can be generated by the network controller and sent to the gateway devices over gateway protocols, such as OpenFlow, without restarting the gateway devices, as explained further in reference to FIGS. 6 and 7.

Figure 6:
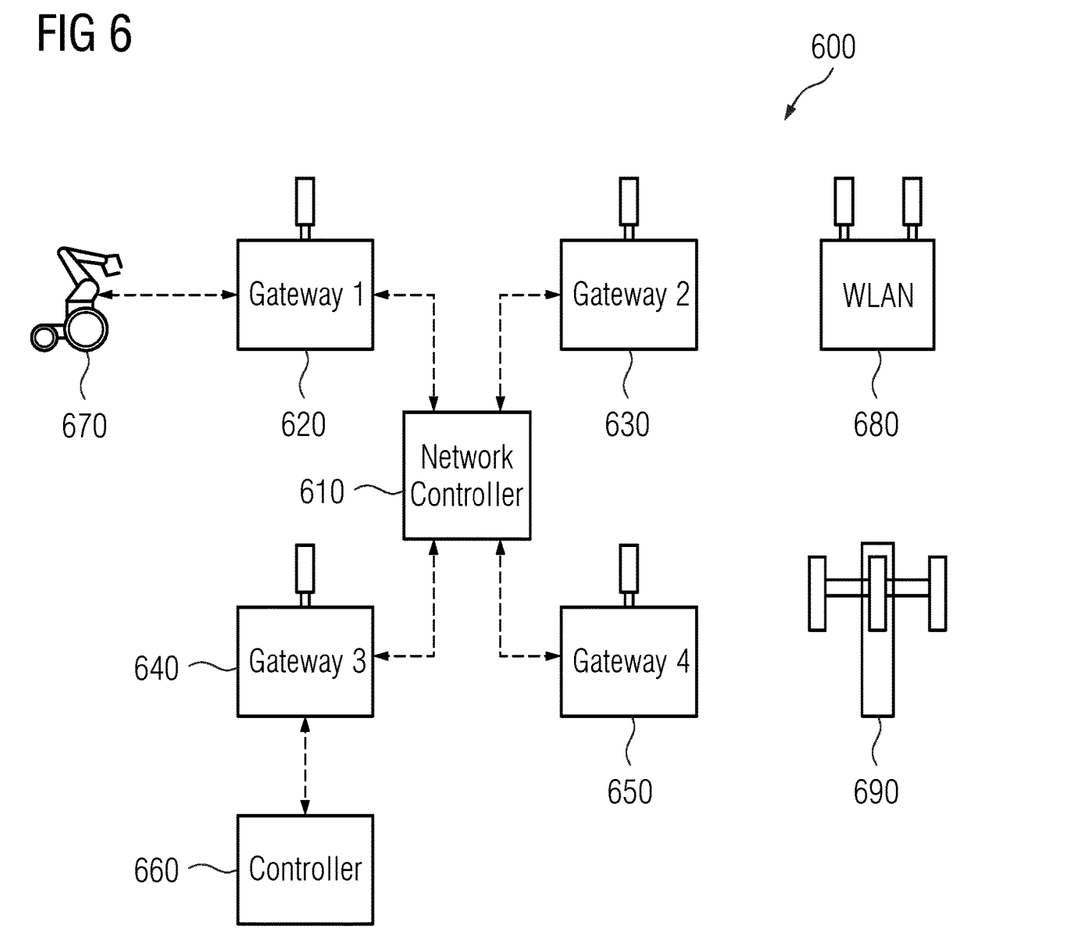
FIG. 6 illustrates an exemplary network controller for generating filters for the gateway devices of the industrial system.

FIG. 6 illustrates an exemplary network controller 610 for generating filters for the gateway devices (620, 630, 640, 650) of the industrial system 100. The gateway devices (620, 630, 640, 650) are connected to two or more networks (shown in FIG. 6 as a cellular network via an access point 690 and a WLAN network via a WLAN device 680). The getaway devices (620, 630, 640, 650) are connected to at least one control device in the industrial system and can transmit data to and from control devices (such as mobile robot 670 and process controller 660). Prioritization and determination of the network to be used for data transmission is performed by the gateway devices using the above-mentioned method of resolution of datagrams into priority queues based on the datagram identifiers and the filter.

The filter on each gateway device is generated by the network controller 610. In an embodiment, this is achieved during engineering and commissioning of the industrial system based on the industrial communication protocols used for communication. At the engineering stage, a plurality of industrial communication protocol identifier formats are provided to the network controller 610 along with the priority associated with each industrial communication protocol. On the basis of the identifier formats, the network controller 610 generates the bit masks of the filter and the mapping between the bit masks and the priority queues. This is then transmitted to the gateway devices. When a new control device is added to the industrial network, the network controller 610 coordinates with the newly added control device to check whether any new industrial communication protocols are used and whether any new bit masks need to be generated and added to the filter. In an embodiment, the network controller 610 can negotiate with the newly added control device to determine a priority for the new industrial communication protocol and the network on which the datagrams related to the new industrial communication protocol is to be transmitted.

The present disclosure can take a form of a computer program product comprising program modules accessible from computer-usable or computer-readable medium storing program code for use by or in connection with one or more computers, processing units, or instruction execution system. Accordingly, the current disclosure describes a non-transitory storage medium for transmitting a plurality of datagrams. The non-transitory storage medium contains machine-readable instructions stored therein, which when executed by a processor of a gateway device, causes the processor of the gateway device to determine a first priority queue from a plurality of the priority queues for transmittal of a first datagram from the plurality of datagrams, based on the datagram identifier of the first datagram, and to place the first datagram in the determined first priority queue for transmittal of the first datagram by a network interface associated with the determined first priority queue. For purposes of this description, a computer-usable or non-transitory computer-readable storage medium can be any apparatus that can contain, store, communicate, propagate, or transport the program for use by or in connection with the instruction execution system, apparatus, or device. The medium can be electronic, magnetic, optical, electromagnetic, infrared, or semiconductor system (or apparatus or device) or a propagation mediums in and of themselves as signal carriers are not included in the definition of physical computer-readable medium include a semiconductor or solid state memory, magnetic tape, a removable computer diskette, random access memory (RAM), a read only memory (ROM), a rigid magnetic disk and optical disk such as compact disk read-only memory (CD-ROM), compact disk read/write, and DVD. Both processing units and program code for implementing each aspect of the technology can be centralized or distributed (or a combination thereof) as known to those skilled in the art.

While the current disclosure is described with references to few industrial devices, a plurality of industrial devices may be utilized in the context of the disclosed embodiments of the invention. Moreover, while the current disclosure is explained using two reference networks 5G and WLan, a plurality of networks (of the same type or different type) may be used. For example, the current disclosure may be realized using three networks: a first cellular network, a second WLan network and a third wired network. Additionally, while the gateway device in the current disclosure as shown as a singular device, the gateway device may be realized using a plurality of devices. For example, a layer 2 switch connected to plurality of network hubs or network interface modules may also be utilized to realize the methods described here. Additionally, while the current invention is explained using datagrams, other such data blocks such as packets, data frames may also be utilized in realization of the current invention. Additionally, while the current invention is explained using layer 2 infrastructure, the disclosed embodiments of the invention may be realized on any layer of the Open Systems Interconnection (OSI) model (including layer 3).

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for transmitting a plurality of datagrams by a gateway device with a plurality of network interfaces, each datagram from the plurality of datagrams comprising a datagram identifier and datagram payload, the datagram payload being associated with a process in an industrial plant, the method comprising:
   a) determining a first priority queue from a plurality of the priority queues for transmittal of a first datagram from the plurality of datagrams, based on a filter comprising a plurality of bit masks and the datagram identifier of the first datagram by identifying a first bit mask from the plurality of bit masks in the filter, a result from a logical operation via the filter between the datagram identifier and the first bit mask being equal to a preconfigured value and the first bit mask being associated with the first priority queue, and each priority queue from the plurality of priority queues being associated with a corresponding network interface from the plurality of network interfaces of the gateway device; and
   b) placing the first datagram in the determined first priority queue for transmittal of the first datagram by a first network interface associated with the determined first priority queue;
   wherein the datagram identifier of the first datagram is generated by a control device based on network Quality of Service (QOS) requirements associated with a process application associated with the first datagram and a first communication protocol; and
   wherein the control device is configured to communicate over a plurality of communication protocols which include the first communication protocol.

2. The method as claimed in claim 1, wherein each bit mask is associated with a corresponding priority queue from the plurality of priority queues.

3. The method as claimed in claim 1, wherein the plurality of interfaces includes a network interface connected to a cellular network and another network interface connected to a Local Area Network.

4. The method as claimed in claim 2, wherein the plurality of interfaces includes a network interface connected to a cellular network and another network interface connected to a Local Area Network.

5. The method as claimed in claim 1, wherein the filter is generated by a network controller based on a network topology of an industrial facility and based on engineering data including network QoS requirements associated with a plurality of process applications.

6. The method as claimed in claim 1, wherein the gateway device comprises a ternary content address memory module utilized to store the filter for determining the first priority queue.

7. The method as claimed in claim 1, wherein the control device comprises a process controller connected to at least one field device comprising at least one of an actuator and a sensor; and wherein network Quality of Service (QOS) requirements includes a loop cycle time of a control loop associated with the process controller.

8. The method as claimed in claim 1, wherein the control device comprises an operator device, and the process application comprises an augmented reality application.

9. The method as claimed in claim 2, wherein the logical operation is a bitwise operation.

10. A method of transmitting datagrams, the method, implemented by a control device, comprising:
    a) generating a first datagram to be transmitted, the first datagram being associated with a process application in an industrial plant;
    b) generating a datagram identifier for the first datagram based on network Quality of Service requirements (QOS) associated with the process application and a first communication protocol from a plurality of communication protocols, the generated datagram identifier being indicative of a priority of the first datagram; and
    c) transmitting the first datagram to a gateway device connected to the control device, the gateway device comprising a plurality of network interfaces;
    wherein the datagram identifier is used by the gateway device to identify a network interface for transmitting the first datagram to a remote system;
    wherein the gateway device is configured to:
        determine a first priority queue from a plurality of priority queues for transmittal of the first datagram from a plurality of datagrams, based on a filter comprising a plurality of bit masks and the datagram identifier of the first datagram by identifying a first bit mask from the plurality of bit masks in the filter, a result from a logical operation via the filter between the datagram identifier and the first bit mask being equal to a preconfigured value and the first bit mask being associated with the first priority queue, and each priority queue from the plurality of priority queues being associated with a corresponding network interface from the plurality of network interfaces of the gateway device.

11. The method as claimed in claim 10, wherein said generating the first datagram comprises identifying a first communication protocol from a plurality of communication protocols, based on network Quality of Service requirements (QoS) associated with the process application.

12. A gateway device for transmitting and receiving a plurality of datagrams, each datagram from the plurality of datagrams comprising a datagram identifier and datagram payload, the datagram payload being associated with a process in an industrial plant, the gateway device comprising:
    a) a plurality of network interfaces, the plurality of network interfaces comprising a first network interface connected to a first network and a second network interface connected to a second network;
    b) a plurality of priority queues, each priority queue for storing at least one datagram and being associated with one of the first and second network interfaces; and
    c) a datagram classification module connected to a content address memory module, the datagram classification module configured to:
        i) determine a first priority queue from the plurality of the priority queues for transmittal of a first datagram from the plurality of datagrams, based on the datagram identifier of the first datagram and a filter comprising a plurality of bit masks and the datagram identifier of the first datagram by identifying a first bit mask from the plurality of bit masks in the filter, a result from a logical operation via the filter between the datagram identifier and the first bit mask being equal to a preconfigured value and the first bit mask being associated with the first priority queue
        ii) place the first datagram in the determined first priority queue for transmittal of the first datagram by a network interface associated with the determined first priority queue; wherein the datagram identifier of the first datagram is generated by a control device based on network Quality of Service requirements associated with a process application associated with the first datagram and a first communication protocol; and wherein the control device is configured to communicate over a plurality of communication protocols which include the first communication protocol.

13. The gateway device as claimed in claim 12, wherein the plurality of interfaces includes a network interface connected to a cellular network and another network interface connected to a Local Area Network.

14. The gateway device as claimed in claim 12, wherein the content address memory module is a ternary content address memory module utilized by the datagram classification module for determining the first priority queue.

15. A non-transitory storage medium for transmitting a plurality of datagrams, the non-transitory storage medium having machine-readable instructions stored therein which, when executed by a processor, cause the processor to:
  i) determine a first priority queue from a plurality of the priority queues for transmittal of a first datagram from the plurality of datagrams, based on a filter comprising a plurality of bit masks and a datagram identifier of the first datagram by identifying a first bit mask from the plurality of bit masks in the filter, a result from a logical operation via the filter between the datagram identifier and the first bit mask being equal to a preconfigured value and the first bit mask being associated with the first priority queue, and each priority queue from the plurality of priority queues being associated with a corresponding network interface from a plurality of network interfaces of a gateway device; and
  ii) place the first datagram in the determined first priority queue for transmittal of the first datagram by a network interface associated with the determined first priority queue;

wherein the datagram identifier of the first datagram is generated by a control device based on network Quality of Service requirements associated with a process application associated with the first datagram and a first communication protocol; and wherein the control device is configured to communicate over a plurality of communication protocols which include the first communication protocol.

\* \* \* \* \*